United States Patent
Shamoto

(10) Patent No.: US 8,505,967 B2
(45) Date of Patent: Aug. 13, 2013

(54) HEAD PROTECTION AIRBAG DEVICE FOR VEHICLE

(75) Inventor: Takehisa Shamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/147,379

(22) PCT Filed: Feb. 3, 2009

(86) PCT No.: PCT/JP2009/051781
§ 371 (c)(1),
(2), (4) Date: Aug. 2, 2011

(87) PCT Pub. No.: WO2010/089847
PCT Pub. Date: Aug. 12, 2010

(65) Prior Publication Data
US 2011/0285117 A1    Nov. 24, 2011

(51) Int. Cl.
*B60R 21/213*    (2011.01)
*B60R 21/2338*    (2011.01)
*B60R 21/232*    (2011.01)

(52) U.S. Cl.
USPC ............... 280/730.2; 280/729; 280/743.2

(58) Field of Classification Search
USPC ............ 280/729, 730.2, 743.1, 743.2
See application file for complete search history.

(56) References Cited

U.S. PATENT DOCUMENTS

| 6,371,512 | B1 | 4/2002 | Asano et al. | |
| 6,375,214 | B1 | 4/2002 | Nishikaji | |
| 6,481,743 | B1 * | 11/2002 | Tobe et al. | 280/728.2 |

(Continued)

FOREIGN PATENT DOCUMENTS

| EP | 1 484 222 | 12/2004 |
| JP | 2000-6750 | 1/2000 |

(Continued)

OTHER PUBLICATIONS

Extended European Search Report for EP Appl. No. 09839625.2 dated Jun. 1, 2012.

(Continued)

*Primary Examiner* — Joseph Rocca
(74) *Attorney, Agent, or Firm* — Finnegan, Henderson, Farabow, Garrett & Dunner, LLP

(57) ABSTRACT

At a time of deployment of an airbag, a rear portion of the airbag and a tension imparting member are prevented from hooking on an upper end of a quarter pillar garnish and impeding deployment of the airbag. An airbag (20) is contained along a door opening (46). An upper expansion portion (20D) is formed on an upper edge side of a rear seat expansion portion (20B), and a rear expansion portion (20E) is formed at a rear end side upper portion. The upper expansion portion is expanded and deployed at the compartment outer side of a terminal part (34A). A rear end side attachment portion (20E) is set at the rear end side of the rear expansion portion (20E), and the rear expansion portion expands inside a quarter pillar garnish (48). A rear end lower portion of the rear seat expansion portion is coupled to the vehicle body by a rear side strap (68). A border portion (72) between a roof head lining (34) and the pillar garnish is specified such that a deployment area (Q) of the upper expansion portion falls within a range where the roof head lining is arranged.

10 Claims, 13 Drawing Sheets

(56) References Cited

U.S. PATENT DOCUMENTS

| | | | |
|---|---|---|---|
| 7,967,332 B2 * | 6/2011 | Karlsson | 280/730.2 |
| 2004/0007857 A1 | 1/2004 | Sonnenberg et al. | |
| 2004/0075257 A1 | 4/2004 | Ogawa et al. | |
| 2004/0178609 A1 | 9/2004 | Totsuka et al. | |
| 2005/0127644 A1 * | 6/2005 | Kino et al. | 280/730.2 |
| 2006/0061071 A1 * | 3/2006 | Noguchi et al. | 280/730.2 |
| 2006/0157958 A1 | 7/2006 | Heudorfer et al. | |
| 2007/0075531 A1 | 4/2007 | Tsuge | |
| 2010/0013203 A1 * | 1/2010 | Mitchell et al. | 280/743.2 |

FOREIGN PATENT DOCUMENTS

| | | |
|---|---|---|
| JP | 2000-168483 | 6/2000 |
| JP | 2001-18731 | 1/2001 |
| JP | 2001-18743 | 1/2001 |
| JP | 2001-80446 | 3/2001 |
| JP | 2001-88650 | 4/2001 |
| JP | 2001-106014 | 4/2001 |
| JP | 2002-187497 | 7/2002 |
| JP | 2003-95033 | 4/2003 |
| JP | 2004-114895 | 4/2004 |
| JP | 2004-148853 | 5/2004 |
| JP | 2007-69721 | 3/2007 |
| JP | 2007-98986 | 4/2007 |

OTHER PUBLICATIONS

International Search Report in International Application No. PCT/JP2009/051781; Mailing Date: Apr. 21, 2009.

Applicant's Response to Written Opinion of the International Search Authority dated Apr. 21, 2009 in International Application No. PCT/JP2009/051781.

Applicant's Response to Written Opinion of the International Search Authority dated Aug. 17, 2010 in International Application No. PCT/JP2009/051781.

* cited by examiner

HEAD PROTECTION AIRBAG DEVICE FOR VEHICLE

CROSS-REFERENCE TO RELATED APPLICATIONS

This application is a national phase application of International Application No. PCT/JP2009/051781, filed Feb. 3, 2009, the contents of which are incorporated herein by reference.

TECHNICAL FIELD

The present invention relates to a head protection airbag device for a vehicle.

BACKGROUND ART

In recent years, a head protection airbag device for a vehicle has been installed as a supplementary device for protection of vehicle occupants. This head protection airbag device deploys an airbag in the form of a curtain below a roof side rail portion at the time of a side collision or at the time of a rollover or the like (hereinafter, the meaning of "the time of a side collision" alone is intended to include the time of a rollover, but when a rollover is to be specifically referred to, "the time of a rollover" is written).

In the below-mentioned Patent Reference 1, a head protection airbag device for a vehicle of this kind is disclosed. To describe it simply, in this head protection airbag device for a vehicle, a rear portion of an airbag that is folded up in a long, narrow shape is accommodated only at the compartment outer side (roof side rail side) of a roof head lining. That is, if viewed in a side elevation of the vehicle, the rear portion of the airbag is accommodated so as not to impinge on an upper end portion of a quarter pillar garnish.

In addition, a front end portion of a tension belt is attached to the lower side of the rear portion of the airbag. A rear end portion of the tension belt is disposed at the compartment outer side of the quarter pillar garnish, and is fixed to a quarter pillar inner panel. Thus, the tension belt is accommodated between the quarter pillar garnish and the quarter pillar inner panel.

According to the structure described above, at the time of a side collision, when the airbag expands and deploys to below the roof side rail, the rear portion of the airbag pushes only the roof head lining to the compartment inner side and expands and deploys broadly. At this time, the front end portion of the tension belt is pulled below the roof side rail by the expansion operation of the airbag and moves to the compartment inner side from the gap between the quarter pillar garnish and the quarter pillar inner panel, and a predetermined tension is imparted to the tension belt.
Patent Reference 1: Japanese Patent No. 2000-006750
Patent Reference 2: Japanese Patent Application Laid-Open (JP-A) No. 2001-088650
Patent Reference 3: JP-A No. 2001-106014
Patent Reference 4: JP-A No. 2001-080446
Patent Reference 5: JP-A No. 2001-018731
Patent Reference 6: JP-A No. 2004-148853
Patent Reference 7: JP-A No. 2003-095033

DISCLOSURE OF INVENTION

Technical Problem

However, with the related art technology described above, the rear portion of the airbag is disposed to be accommodated only at the compartment outer side of the roof head lining, and the rear portion of the airbag and the front end portion of the tension belt descend below the roof side rail through a border between the roof head lining and the quarter pillar garnish. Consequently, the tension belt and/or the rear portion of the airbag may be hooked on the upper end portion of the quarter pillar garnish at the time of deployment of the airbag. Accordingly, there is room for further improvement of the related art technology in this respect.

Applying tension substantially along the line of the belt at the lower side (lower edge side) of the rear portion of the airbag is very advantageous in regard to occupant protection at the time of a rollover. Therefore, care is needed to not impair the excellence of the related art technology mentioned above in this respect.

In consideration of the situation described above, an object of the present invention is to provide a head protection airbag device for a vehicle that is capable, at a time of deployment of the airbag, of preventing or inhibiting a rear portion of the airbag or a tension imparting member, such as a tension strap or the like, from hooking on an upper end portion of a quarter pillar garnish and impeding deployment of the airbag.

Solution to Problem

A head protection airbag device for a vehicle relating to a first aspect of the present invention includes: a front seat expansion portion that is folded into a long, narrow shape and contained along a door opening, and that, by an inflow of gas via an upper side communication channel that is formed with a length direction thereof along the vehicle front-rear direction, is expanded and deployed between a head area side surface of an occupant sitting on a front seat and a door glass of a front seat side door; a rear seat expansion portion that is provided at a vehicle rear side of the front seat expansion portion and that is folded into the long, narrow shape and contained along the door opening, and that, by the inflow of gas via the upper side communication channel that is formed with the length direction thereof along the vehicle front-rear direction, is expanded and deployed between a head area side surface of an occupant sitting on a rear seat and a door glass of a rear seat side door; an upper expansion portion that is provided at an upper edge side of the rear seat expansion portion and that, by the inflow of gas, is expanded and deployed more promptly than the rear seat expansion portion to the vehicle upper side relative to a line joining a plurality of attachment pieces provided along an upper edge of a rear side expansion portion and is expanded and deployed such that a protection area of the head area side surface of the occupant sitting on the rear seat is covered by the rear seat expansion portion, at a compartment outer side of a ceiling member; a rear end side fixing portion that is set at a non-expanding portion, which is provided at the vehicle rear side of at least one of the upper expansion portion and the rear seat expansion portion, and that fixes the non-expanding portion to a quarter pillar inner panel covered by a quarter pillar garnish; and a border portion between the ceiling member and the quarter pillar garnish, which border portion is specified such that a deployment area of the upper expansion portion falls within a range where the ceiling member is arranged.

A head protection airbag device for a vehicle relating to a second aspect of the present invention is the first aspect of the invention, in which the rear end side fixing portion is set at a position along the door opening.

A head protection airbag device for a vehicle relating to a third aspect of the present invention is the first or second aspect of the invention, provided with a tension imparting member of which a front end portion is fixed to a lower side of the rear seat expansion portion and a rear end portion is fixed to a quarter pillar inner panel disposed at the compartment outer side of the quarter pillar garnish, the tension imparting member imparting a tension force that pulls the lower side of the rear seat expansion portion toward the vehicle rear side when the rear seat expansion portion expands and deploys.

A head protection airbag device for a vehicle relating to a fourth aspect of the present invention is the third aspect of the invention, provided with a rear expansion portion that is in fluid communication with the rear seat expansion portion and extends to the compartment outer side of the quarter pillar garnish, a vehicle width direction thickness thereof at a time of expansion being specified to be thicker than a width of a gap between the quarter pillar garnish and the quarter pillar inner panel disposed at the compartment outer side of the quarter pillar garnish.

A head protection airbag device for a vehicle relating to a fifth aspect of the present invention is the fourth aspect of the invention, in which the rear end side fixing portion is set at the rear end side of the rear expansion portion.

A head protection airbag device for a vehicle relating to a sixth aspect of the present invention is the fourth or fifth aspect of the invention, in which the quarter pillar garnish and the quarter pillar inner panel are coupled to one another by a coupler that couples the quarter pillar garnish to be movable from an assembly position thereof to the compartment inner side.

A head protection airbag device for a vehicle relating to a seventh aspect of the present invention is the sixth aspect of the invention, in which the thickness of the rear expansion portion along the vehicle width direction at a time of expansion and deployment is specified to be less than half of a thickness along the vehicle width direction of the rear seat expansion portion at the time of expansion and deployment.

A head protection airbag device for a vehicle relating to an eighth aspect of the present invention is any one of the first to seventh aspects of the invention, in which the upper expansion portion, which bulges in a direction opposite to a direction of expansion of the rear seat expansion portion, is formed at the upper edge side of the rear seat expansion portion in a state in which the airbag provided with the front seat expansion portion, the rear seat expansion portion and the upper expansion portion is deployed in a flat shape, and a lower side of the airbag with reference to the upper edge is folded up by roll-folding, the upper expansion portion that is the upper side of the airbag with reference to the upper edge is folded up by bellows-folding, and the bellows-folded portion is disposed on the roll-folded portion.

A head protection airbag device for a vehicle relating to a ninth aspect of the present invention is any one of the first to eighth aspects of the invention, in which a gas generator that ejects gas when operated is disposed at a vehicle front-rear direction substantially middle portion of the airbag provided with the front seat expansion portion, the rear seat expansion portion and the upper expansion portion.

A head protection airbag device for a vehicle relating to a tenth aspect of the present invention is the first aspect of the invention, in which a supplementary inner cover structured as a separate part from the ceiling member and the quarter pillar garnish is disposed in a range that overlaps with the deployment area of the upper expansion portion.

According to the first aspect of the present invention, at the time of a side collision or rollover, gas inflows via the upper side communication channel into the front seat expansion portion that is folded up in a long, narrow shape and contained along the door opening. Thus, the front seat expansion portion expands and deploys between the head area side surface of an occupant sitting on the front seat and the door glass of the front seat side door. Gas also inflows via the upper side communication channel into the rear seat expansion portion that is folded up in the long, narrow shape and accommodated along the door opening. Thus, the front seat expansion portion expands and deploys between the head area side surface of an occupant sitting on the rear seat and the door glass of the rear seat side door.

Moreover, in the present invention, at the time of a side collision or rollover, the gas also inflows into the upper expansion portion provided at the upper edge side of the rear seat expansion portion. Thus, the upper expansion portion expands and deploys more promptly than the rear seat expansion portion to the vehicle upper side relative to a line joining plural attachment pieces provided along the upper edge of the rear seat expansion portion, and expands and deploys to the compartment outer side of the ceiling member such that a protection area for the head area side surface of the occupant sitting on the rear seat is covered by the upper expansion portion and the rear seat expansion portion. As a result, the protection area of the head area side surface of the occupant sitting on the rear seat is covered by the rear seat expansion portion and the upper expansion portion.

In the present invention, the rear end side fixing portion is not set at the upper end side of the rear seat expansion portion but is set at the non-expanding portion provided at the vehicle rear side of one or both of the upper expansion portion and the rear seat expansion portion described below. Thus, the upper expansion portion that expands and deploys to the vehicle upper side relative to the line joining plural attachment pieces provided along the upper edge and expands and deploys to the compartment outer side of the ceiling member and to the protection area for the head area side surface of the occupant sitting on the rear seat may be provided at the upper edge side of the rear seat expansion portion. As a result, the protection area for the head area side surface of the occupant sitting on the rear seat may be covered by the rear seat expansion portion and the upper expansion portion, and the head area side surface of the occupant may be protected.

In the state in which the rear seat expansion portion has expanded and deployed, a tension line is formed at positions joining the rear end side fixing point with the front end side fixing point at which the front seat expansion portion is fixed to the vehicle body. This tension line is formed at positions that are lowered to the vehicle lower side relative to a tension line if the rear end side fixing point were at the upper edge side of the rear seat expansion portion as in the related art. Therefore, compared to a related art configuration, exposure of an occupant outside the vehicle at a time of rollover is more effectively prevented.

In the present invention, the border portion between the ceiling member and the quarter pillar garnish is specified such that the deployment area of the upper expansion portion falls within the range where the ceiling member is arranged. Consequently, when the rear seat expansion portion is expanding and deploying to the vehicle lower side, the rear seat expansion portion is prevented or inhibited from hooking on the upper end portion of the quarter pillar garnish.

According to the second aspect of the present invention, the rear end side fixing portion set at the vehicle rear side of one or both of the upper expansion portion and the rear seat expansion portion is set to be disposed along the door opening. Thus, the rear end side fixing portion may support the expansion portions from a position close to the expansion portions.

According to the third aspect of the present invention, when the rear seat expansion portion expands and deploys to the vehicle lower side, the front end portion of the tension imparting member moves to the vehicle lower side correspondingly. The rear end portion of the tension imparting member is fixed to the quarter pillar inner panel, and when expansion and deployment of the rear seat expansion portion has been completed, the lower side of the rear seat expansion portion is pulled toward the vehicle rear side. Therefore, a tension line that passes through the rear end portion of the tension imparting member is formed in the rear seat expansion portion.

Because this tension imparting member is provided, the tension line formed in the rear seat expansion portion may be lowered.

According to the fourth aspect of the present invention, when the rear seat expansion portion is expanding and deploying to the vehicle lower side, the rear expansion portion that is in fluid communication with the rear seat expansion portion is also expanded. Because this rear expansion portion is provided extending to the vehicle compartment outer side of the quarter pillar garnish, the quarter pillar garnish is pushed to the compartment inner side when the rear expansion portion expands and deploys. The vehicle width direction thickness of the rear expansion portion at the time of expansion is specified to be thicker than the width of the gap between the quarter pillar garnish and the quarter pillar inner panel disposed at the compartment outer side. Therefore, when the rear expansion portion expands and deploys, the quarter pillar garnish detaches from the quarter pillar inner panel or is pushed to widen to the compartment inner side. Hence, the tension imparting member is less likely to hook on the quarter pillar garnish.

According to the fifth aspect of the present invention, when the rear expansion portion is expanding, the rear expansion portion expands subject to a portion of a reaction force at the rear end side fixing portion. Therefore, the quarter pillar garnish may be promptly pushed to the compartment inner side.

According to the sixth aspect of the present invention, the quarter pillar garnish is coupled to the quarter pillar inner panel by the coupler. Therefore, even if the rear expansion portion expands and the quarter pillar garnish is pushed by the rear expansion portion and moves away from the quarter pillar inner panel, the quarter pillar garnish does not move to the compartment inner side beyond a range of coupling.

According to the seventh aspect of the present invention, the thickness of the rear expansion portion along the vehicle width direction at the time of expansion and deployment is less than half of the thickness of the rear seat expansion portion along the vehicle width direction at the time of expansion and deployment. Therefore, deformation of the quarter pillar garnish is kept very small.

According to the eighth aspect of the present invention, the lower side of the airbag with reference to the upper edge is folded up by roll-folding and the upper expansion portion that is at the upper side of the airbag with reference to the upper edge is folded up by bellows-folding, and the bellows-folded portion is disposed on the roll-folded portion. Because this bellows-folded portion deploys more easily than the roll-folded portion, at the start of deployment of the airbag, the upper expansion portion is expanded and deployed prior to the front seat expansion portion and the rear seat expansion portion.

According to the ninth aspect of the invention, the gas generator is disposed at a substantial middle portion of the airbag in the vehicle front-rear direction. Therefore, the gas generator supplies discharged gas to both the front seat expansion portion and the rear seat expansion portion in parallel.

According to the tenth aspect of the present invention, the supplementary inner cover that is constituted as a separate part from the ceiling member and the quarter pillar garnish is disposed at a range overlapping the deployment area of the upper expansion portion. Therefore, if the ceiling member may not be extended to the position covering the deployment area of the upper deployment portion, for reasons relating to molding characteristics or productivity, the supplementary inner cover may be disposed at the deployment area of the upper deployment portion.

Advantageous Effects of Invention

As described above, the head protection airbag device for a vehicle relating to the first aspect of the present invention has an excellent effect in that, at a time of deployment of the airbag, a rear portion of the airbag and a tension imparting member such as a tension strap or the like are prevented or inhibited from hooking on an upper end portion of a quarter pillar garnish and impeding deployment of the airbag.

The head protection airbag device for a vehicle relating to the second aspect of the present invention has an excellent effect in that, at a time of expansion and deployment of the rear seat expansion portion, flapping of the upper expansion portion or rear seat expansion portion, or both, may be effectively suppressed.

The head protection airbag device for a vehicle relating to the third aspect of the present invention has an excellent effect in that exposure of an occupant outside the vehicle at the time of a rollover may be more effectively impeded.

The head protection airbag device for a vehicle relating to the fourth aspect of the present invention has an excellent effect in that hooking of the tension imparting member on the quarter pillar garnish may be prevented or inhibited and a tension line may be promptly formed at the lower side of the rear expansion portion.

The head protection airbag device for a vehicle relating to the fifth aspect of the present invention has an excellent effect in that the tension imparting member may be promptly moved at a time of expansion and deployment of the rear seat expansion portion.

The head protection airbag device for a vehicle relating to the sixth aspect of the present invention has an excellent effect in that the quarter pillar garnish may be prevented or inhibited from deforming excessively and breaking or scattering.

The head protection airbag device for a vehicle relating to the seventh aspect of the present invention has an excellent effect in that breakage and scattering of the quarter pillar garnish may be assuredly prevented.

The head protection airbag device for a vehicle relating to the eighth aspect of the present invention has an excellent effect in that the protection area of the head area side surface of an occupant sitting on the rear seat may be quickly covered.

The head protection airbag device for a vehicle relating to the ninth aspect of the present invention has an excellent effect in that the front seat expansion portion and rear seat expansion portion may be more promptly expanded and deployed than if gas is supplied from a front end portion or a rear end portion of the airbag.

The head protection airbag device for a vehicle relating to the tenth aspect of the present invention has an excellent effect in that molding characteristics and productivity of the ceiling member may be excellently maintained.

DESCRIPTION OF EMBODIMENTS

First Exemplary Embodiment

Below, a first exemplary embodiment of a head protection airbag device for a vehicle relating to the present invention is described using FIG. 1 to FIG. 10. The arrow FR that is shown as appropriate in these drawings indicates the forward side of the vehicle, the arrow UP represents the vehicle upward side, and the arrow IN represents a vehicle width direction inward side.

—Overall Structure of a Head Protection Airbag Device for a Vehicle 10—

Figure 1:
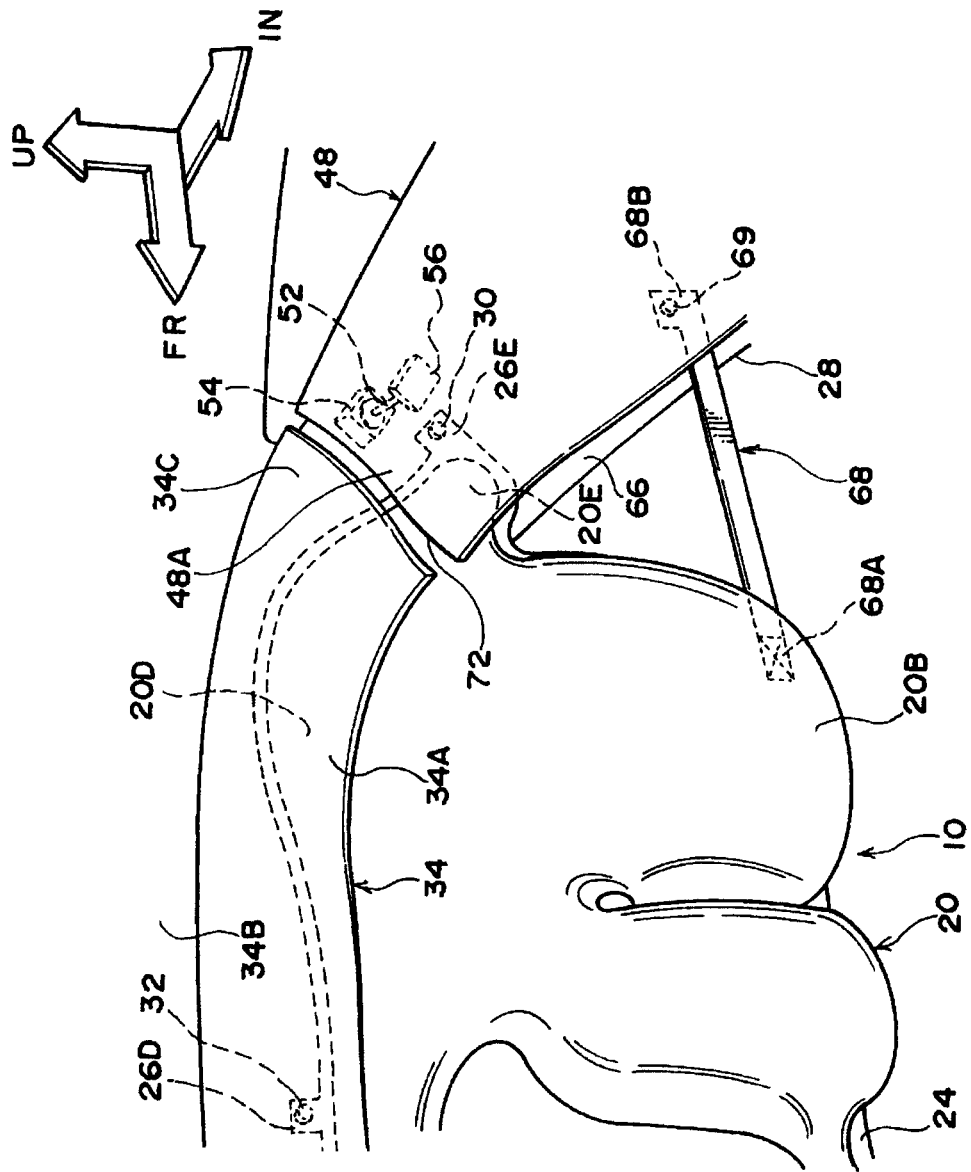
FIG. 1 is a magnified perspective view of principal portions, drawn around a rear seat expansion portion, an upper expansion portion and a rear expansion portion relating to principal portions of a first exemplary embodiment.
Figure 2:
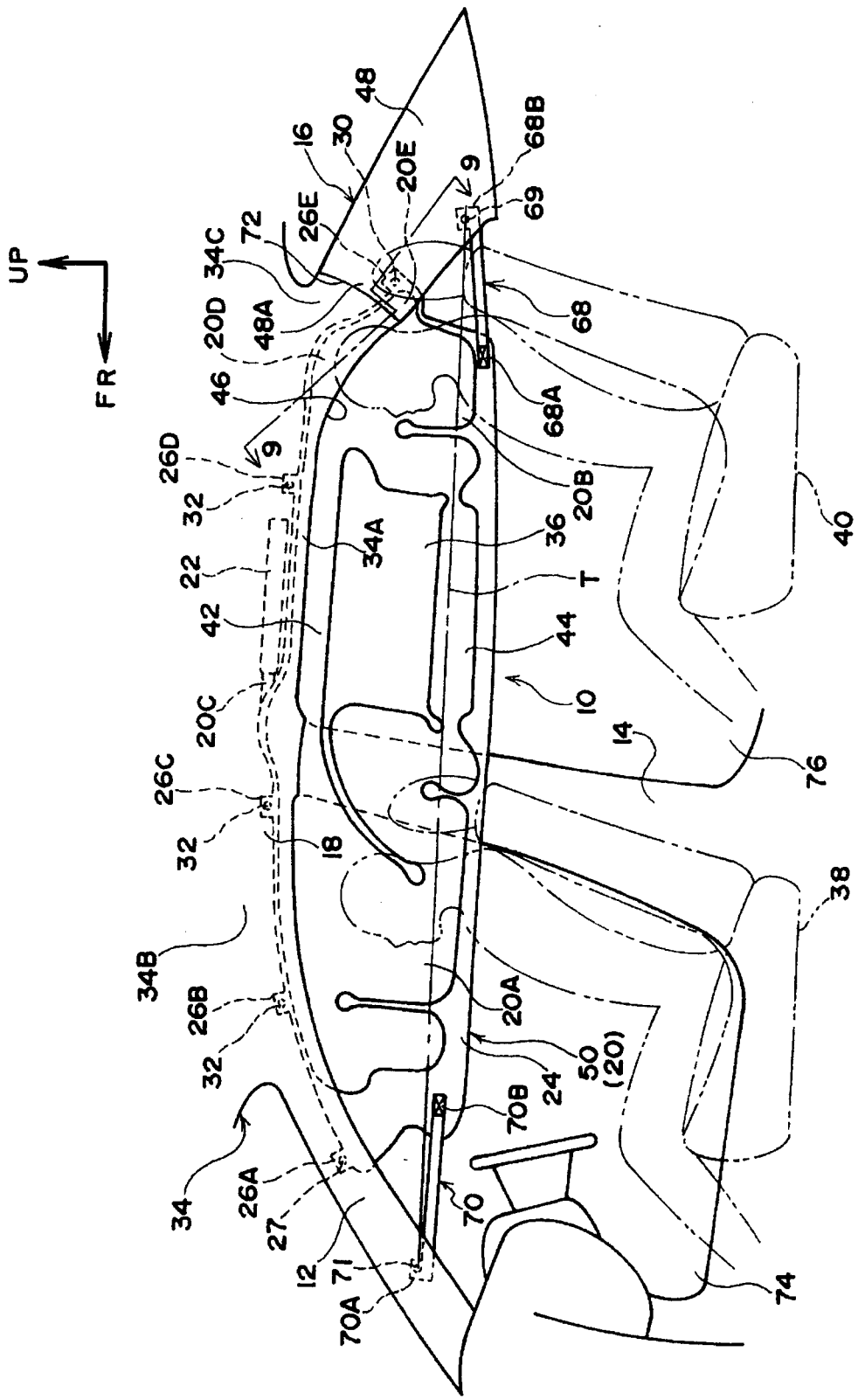
FIG. 2 is a side elevation of a state in which a head protection airbag device for a vehicle relating to the first exemplary embodiment operates and the airbag is expanded and deployed, viewed from a compartment inner side.
Figure 3:
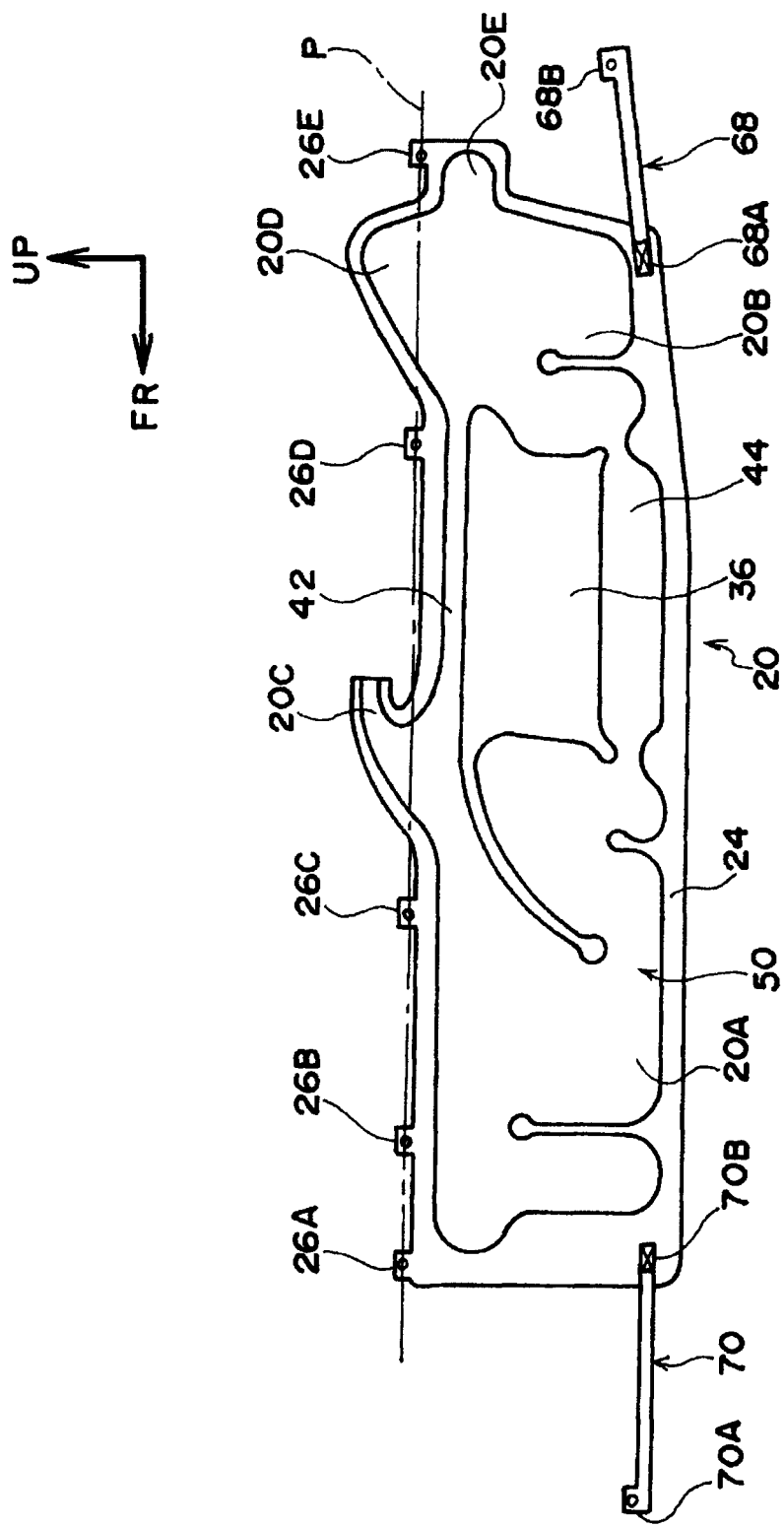
FIG. 3 is a plan view illustrating a state in which the airbag illustrated in FIG. 1 is deployed in a flat shape.
Figure 4:
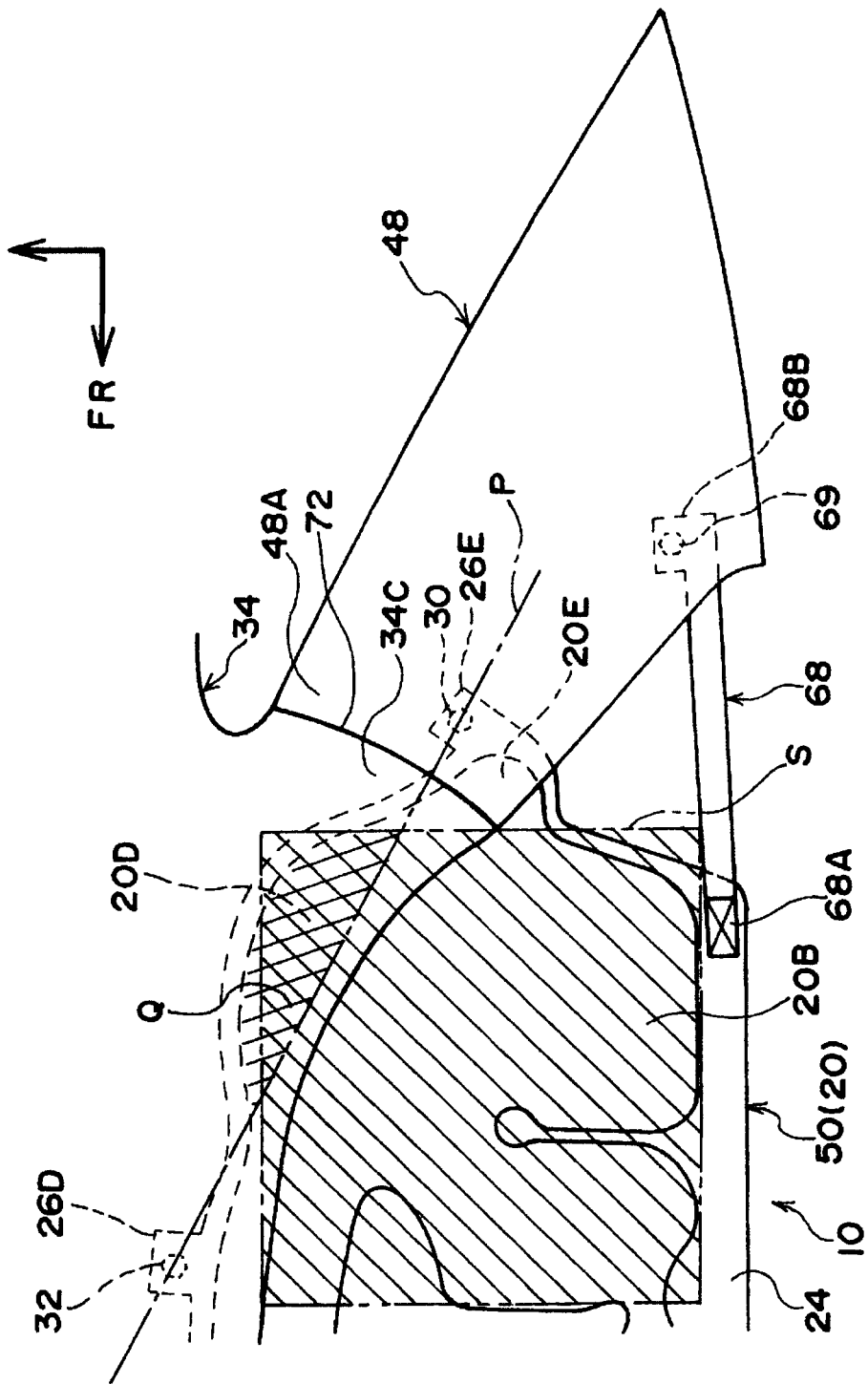
FIG. 4 is a magnified side elevation of principal portions in which a vicinity of the rear seat expansion portion of the airbag illustrated in FIG. 2 is magnified.

FIG. 2 shows a side elevation in which the head protection airbag device for a vehicle relating to the first exemplary embodiment operates and the airbag is expanded and deployed, viewed from the compartment inner side. FIG. 1 shows a magnified perspective view of principal portions, drawn around a rear seat expansion portion, an upper expansion portion and a rear expansion portion relating to principal portions of the present exemplary embodiment. FIG. 3 shows a plan view illustrating a state in which the airbag illustrated in FIG. 1 is deployed in a flat shape. FIG. 4 shows a magnified side elevation of principal portions in which a vicinity of the rear seat expansion portion of the airbag illustrated in FIG. 2 is magnified.

As illustrated in these drawings (particularly FIG. 2), the head protection airbag device for a vehicle 10 is constituted to include an airbag 20 and a substantially circular rod-shaped inflator 22. The airbag 20 is arranged in a folded state along a roof side rail 18 extending between a front pillar (pillar A) 12, a center pillar (pillar B) 14 and a quarter pillar (pillar C) 16. The inflator 22 is disposed at and connected to a vicinity of a length direction middle portion of the airbag 20, and serves as a gas generator that operates and discharges gas at the time of a side collision or the time of a rollover.

As illustrated in FIG. 3, the airbag 20 is formed in a substantially rectangular shape which is narrow and long in the vehicle front-rear direction. A periphery edge portion (outer periphery portion) of the airbag 20 serves as a non-expanding portion 24 into which the gas does not inflow. Plural attachment pieces 26A to 26E are formed with an appropriate spacing at an upper edge side of the non-expanding portion 24. Each of the attachment pieces 26A to 26E is formed in a rectangular shape. The attachment piece 26A at the front end side is fastened and fixed by a bolt and weld nut 27 to a front pillar inner panel of the front pillar 12, and the attachment piece 26E at the rear end side is fastened and fixed by a bolt and weld nut 30 to a quarter pillar inner panel 28 (see FIG. 1) of the quarter pillar 16. The middle portion attachment pieces 26B to 26D are fastened and fixed by bolts and weld nuts 32 to a roof side rail inner panel 31 of the roof side rail 18 (see FIG. 9 and FIG. 10).

A substantially rectangular non-expanding portion 36 is formed at the vicinity of a length direction middle portion of the airbag 20. Thus, a front seat expansion portion 20A that expands to the side of the head area of an occupant sitting on a front seat 38, and a rear seat expansion portion 20B that expands to the side of the head area of an occupant sitting on a rear seat 40 are formed. The front seat expansion portion 20A and the rear seat expansion portion 20B are constituted by connecting plural cells, which are respectively formed in substantially tubular shapes, in the vehicle front-rear direction.

The front seat expansion portion 20A and the rear seat expansion portion 20B are put into fluid communication with one another by a pair of upper and lower communication channels 42 and 44 formed between the front seat expansion portion 20A and the rear seat expansion portion 20B. The communication channels 42 and 44 are formed with length directions thereof in the vehicle front-rear direction. A gas introduction portion 20C that extends in a fin shape to the vehicle upper side is connected to a front end portion of the communication channel 42. A gas discharge section of the inflator 22 is connected to this gas introduction portion 20C (see FIG. 2), and gas inflows through the gas introduction portion 20C.

The inflator 22 is connected to an airbag electronic control unit (ECU) (a controller) that is disposed below a console box or suchlike. The inflator 22 is electrified, operates and generates gas when a side collision state or a rollover state is detected by an unillustrated side collision detection sensor (detector) disposed at a lower portion of the center pillar 14 or the like or an unillustrated rollover detection sensor (detector) disposed in the airbag ECU or the like.

Returning to FIG. 2, the head protection airbag device for a vehicle 10 described above is covered by a terminal part 34A of a roof head lining 34 that serves as a ceiling member. That is, the roof head lining 34 is provided with a general portion 34B that extends in a substantially flat shape in both the vehicle front-rear direction and the vehicle width direction. The terminal part 34A is formed at each of the two vehicle width direction end portions of the general portion 34B. The terminal part 34A depends with curving and gentle inflection to the vehicle lower side from the general portion 34B. The airbag 20, which is folded up in a long, narrow shape, is contained along a door opening 46 at the compartment outer side of the terminal part 34A. In a condition after assembly, (an upper edge of) an upper end portion 48A of a quarter pillar garnish 48, which is described below, is disposed in a state of overlapping from the compartment inner side with an end edge portion of the terminal part 34A of the roof head lining 34.

—Structure at the Quarter Pillar Garnish 48—

The roof head lining 34 is connected to pillar garnishes, which are inner linings of the pillars. Herebelow, the quarter pillar garnish 48 is described in relation to principal portions of the present exemplary embodiment.

The quarter pillar garnish 48, which is both an inner covering and an inner lining, is provided at the compartment inner side of the quarter pillar inner panel 28 of the roof side rail 18 (see FIG. 1). The quarter pillar garnish 48 is constituted by a resin material that is harder than the roof head lining 34. Therefore, if an external force is applied, the terminal part 34A of the roof head lining 34 may bend to the compartment inner side more easily. When an external force is applied, the quarter pillar garnish 48 resiliently deforms, but is less likely to bend and more likely to break than the terminal part 34A of the roof head lining 34. This vehicle is a sedan-type vehicle, and the quarter pillar garnish 48 has a shape that is angled forward as viewed from the compartment inner side.

—Structure of Principal Portions of the Present Embodiment—

Next, the structure of principal portions of the present exemplary embodiment is described.

As illustrated in FIG. 1 to FIG. 4, FIG. 9 and FIG. 10, an upper expansion portion 20D is integrally formed at the upper edge side of the rear seat expansion portion 20B of the aforementioned airbag 20 (more specifically, at the vehicle upper side relative to the single-dot chain line P joining the aforementioned attachment pieces 26A to 26E (see FIG. 3)). The upper expansion portion 20D bulges to the vehicle upper side. Portions at the lower side relative to the single-dot chain line P are a region that may be described as the main body portion of the airbag 20 (hereinafter, this region is collectively referred to as a main body portion 50).

The above-mentioned upper expansion portion 20D is formed in a right-angled triangle shape in a vehicle side view (with the hypotenuse oriented downward and the right-angled corner oriented upward. The upper expansion portion 20D is in fluid communication with the rear seat expansion portion 20B. In the state in which the airbag 20 has expanded and deployed, a protection area S (see FIG. 4) of a head area side surface of an occupant sitting on the rear seat 40 is covered by the rear seat expansion portion 20B and the upper expansion portion 20D. The upper expansion portion 20D is disposed between the two attachment pieces 26D and 26E at the rear side. When the airbag 20 expands and deploys, the upper expansion portion 20D expands and deploys at the compartment outer side of the terminal part 34A of the roof head lining 34 (see FIG. 1).

A rear expansion portion 20E is integrally formed at a rear end portion of the above-mentioned rear seat expansion portion 20B of the airbag 20. The rear expansion portion 20E protrudes toward the vehicle rear side. The rear expansion portion 20E is disposed at a rear end upper portion of the rear seat expansion portion 20B, and is in fluid communication with the rear seat expansion portion 20B. The aforementioned rear end side attachment piece 26E is set at the non-expanding portion 24 that is formed at an outer periphery portion of the rear expansion portion 20E. In the state in which the head protection airbag device for a vehicle 10 is mounted at the vehicle, the rear expansion portion 20E is disposed at the compartment outer side of the quarter pillar garnish 48 (in other words, is disposed such that, viewed from the compartment inner side, the rear expansion portion 20E is superposed (overlaps) with the upper end portion 48A of the quarter pillar garnish 48). The rear end side attachment piece 26E is fixed to the quarter pillar inner panel 28 of the quarter pillar 16 by the bolt and weld nut 30. Thus, in the state in which the airbag 20 expands and deploys, the rear expansion portion 20E expands between the quarter pillar inner panel 28 and the quarter pillar garnish 48.

Figure 9:
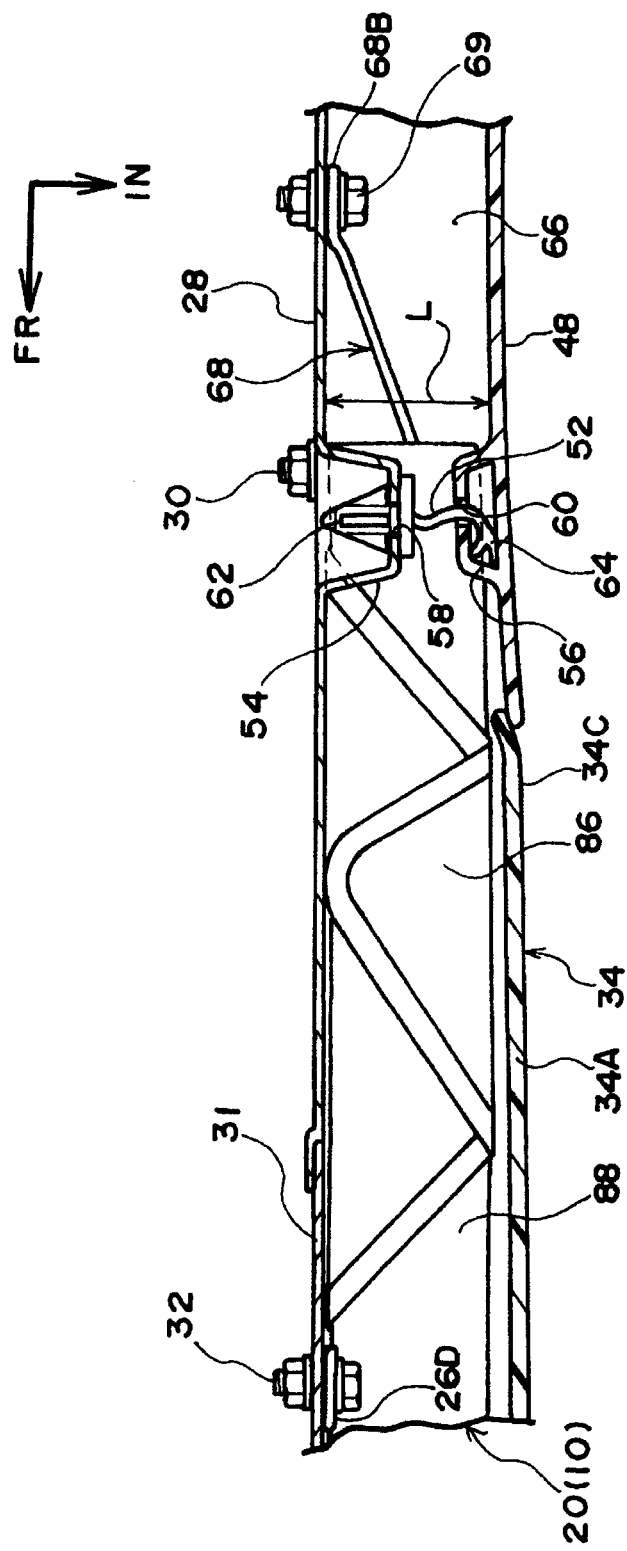
FIG. 9 is a magnified lateral sectional diagram cut in a vicinity of a position of arrangement of the upper expansion portion (a magnified sectional diagram taken along line 9-9 in FIG. 2).
Figure 10:
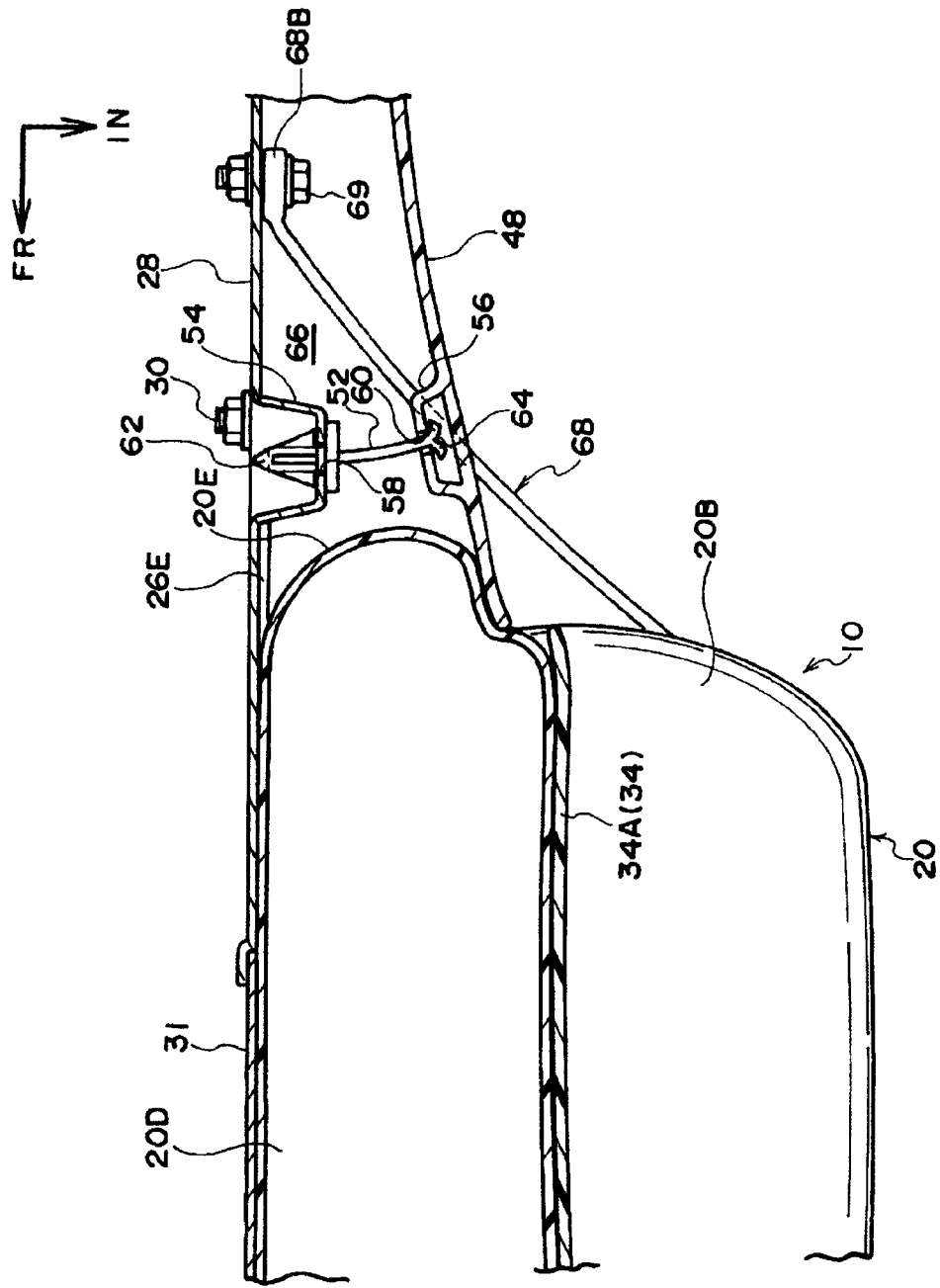
FIG. 10 is a magnified lateral sectional diagram illustrating a state when the upper expansion portion and the rear seat expansion portion are expanded and deployed from the state illustrated in FIG. 9.

As illustrated in FIG. 1, FIG. 9 and FIG. 10, the above-mentioned quarter pillar garnish 48 and quarter pillar inner panel 28 are coupled to one another by a strap 52 that serves as a coupler. More specifically, as illustrated in FIG. 9 and FIG. 10, a pedestal portion 54 protruding to the compartment inner side is integrally formed at the quarter pillar inner panel 28. Correspondingly, a pedestal portion 56 that protrudes to the compartment outer side is integrally formed at a position of a compartment outer side face of the quarter pillar garnish 48 that opposes the pedestal portion 54. Insertion holes 58 and 60 are formed at central portions of the pedestal portions 54 and 56. One end portion of the strap 52, which is formed in a cord shape of a resin material, is anchored in the insertion hole 58 at the pedestal portion 54. A resin clip 62 is integrally formed at the one end portion of the strap 52, and this resin clip 62 is inserted into and anchored at the insertion hole 58. Thus, the one end portion of the strap 52 is prevented from disengaging from the quarter pillar inner panel 28. An anchoring portion 64 for preventing disengagement is integrally formed at the other end portion of the strap 52. This anchoring portion 64 is inserted into and anchored in the insertion hole 60 at the pedestal portion 56, and thus the other end portion of the strap 52 is prevented from disengaging from the quarter pillar garnish 48.

A length of the strap 52 is specified to be longer by a predetermined length than a gap dimension L of a gap 66 (see FIG. 9) that is formed between the compartment outer side face of the quarter pillar garnish 48 and the compartment inner side face of the quarter pillar inner panel 28, in the assembled state. Thus, a separation distance when the rear expansion portion 20E expands and an unillustrated resin clip for stopping which is formed at the quarter pillar garnish 48 detaches from the quarter pillar inner panel 28 (a movement distance thereof to the compartment inner side) is regulated.

As illustrated in FIG. 1 to FIG. 5 and suchlike, a rear side strap 68 that serves as a tension imparting member is disposed at a lower edge side rear end portion of the aforementioned non-expanding portion 24 of the airbag 20. The rear side strap 68 is structured as a belt member constituted of the same material as the airbag 20, and a front end portion 68A thereof is fixed by sewing or the like to the lower edge side rear end portion of the non-expanding portion 24. A rear end portion 68B of the rear side strap 68 is attached by a bolt and weld nut 69 to the quarter pillar inner panel 28 of the quarter pillar 16. At the front side of the airbag 20, a front side strap 70 with a similar constitution to the rear side strap 68 is provided. A front end portion 70A of the front side strap 70 is fixed by a bolt and weld nut 71 to a pillar inner panel (not illustrated) of the front pillar 12. A rear end portion 70B of the front side strap 70 is fixed by sewing or the like to a lower edge side front end portion of the non-expanding portion 24 of the airbag 20.

A border portion 72 between the roof head lining 34 and the quarter pillar garnish 48 is specified such that, in the state in which the airbag 20 has expanded and deployed, a deployment area of the upper expansion portion 20D (the shaded portion Q in FIG. 4) falls within a range where the roof head lining 34 is arranged. That is, a quarter pillar side protrusion portion 34C of the roof head lining 34 is protruded as far as a position such that the deployment area Q of the upper expansion portion 20D does not impinge on the upper end portion 48A of the quarter pillar garnish 48.

Figure 5:
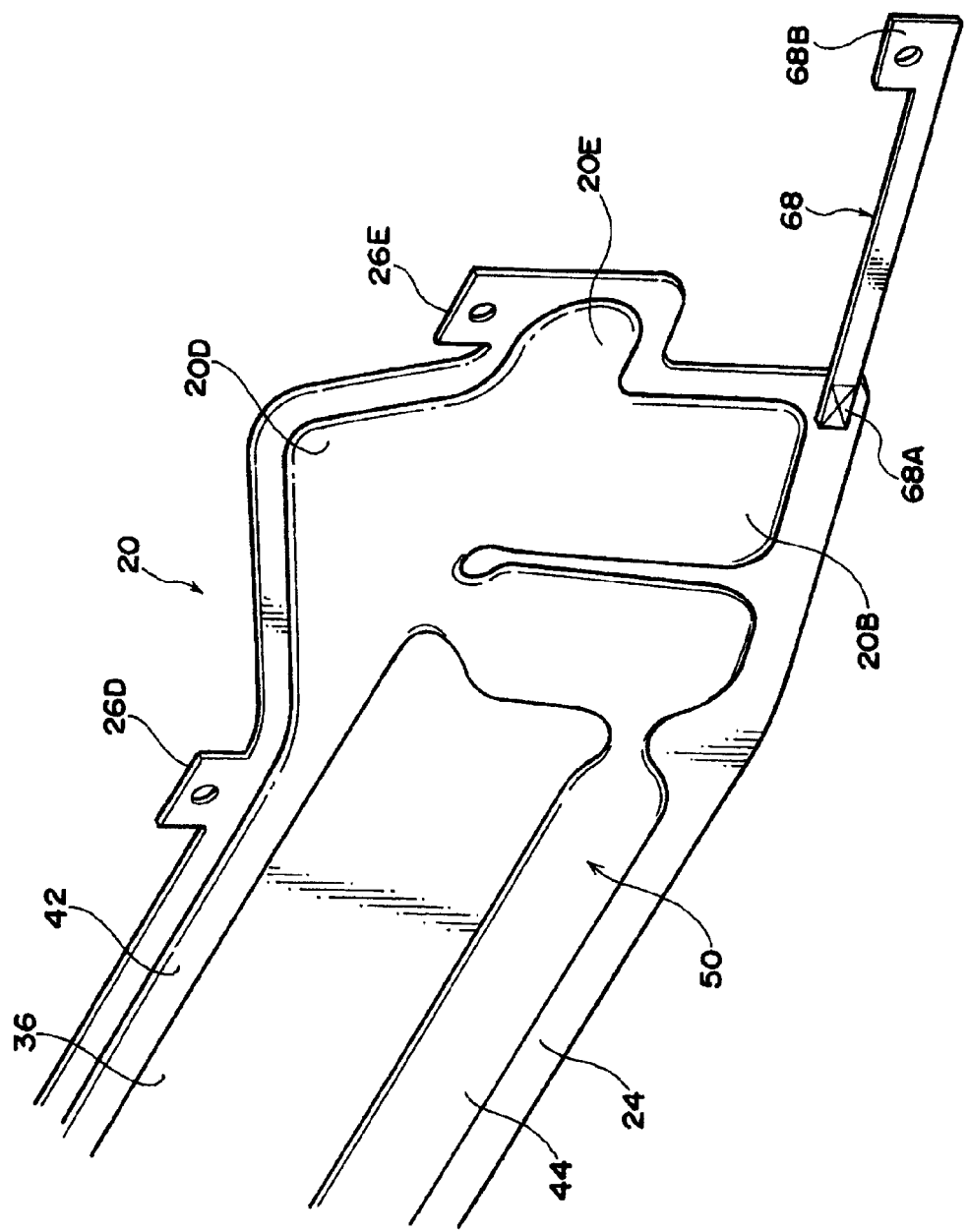
FIG. 5 is a magnified perspective view in which a rear portion of the airbag in a state prior to folding is magnified.
Figure 6:
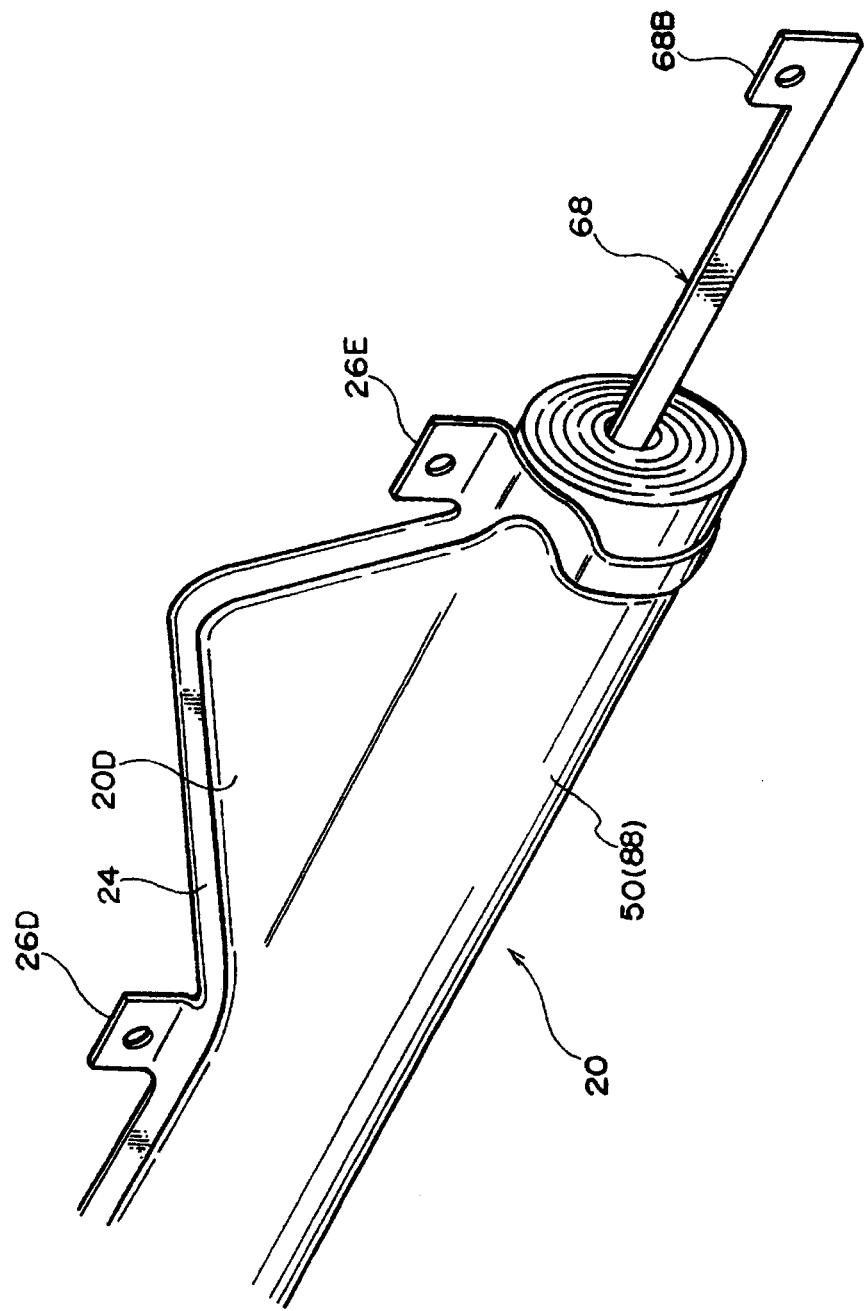
FIG. 6 is a magnified perspective view illustrating a state in which a main body portion of the airbag illustrated in FIG. 5 is roll-folded.
Figure 7:
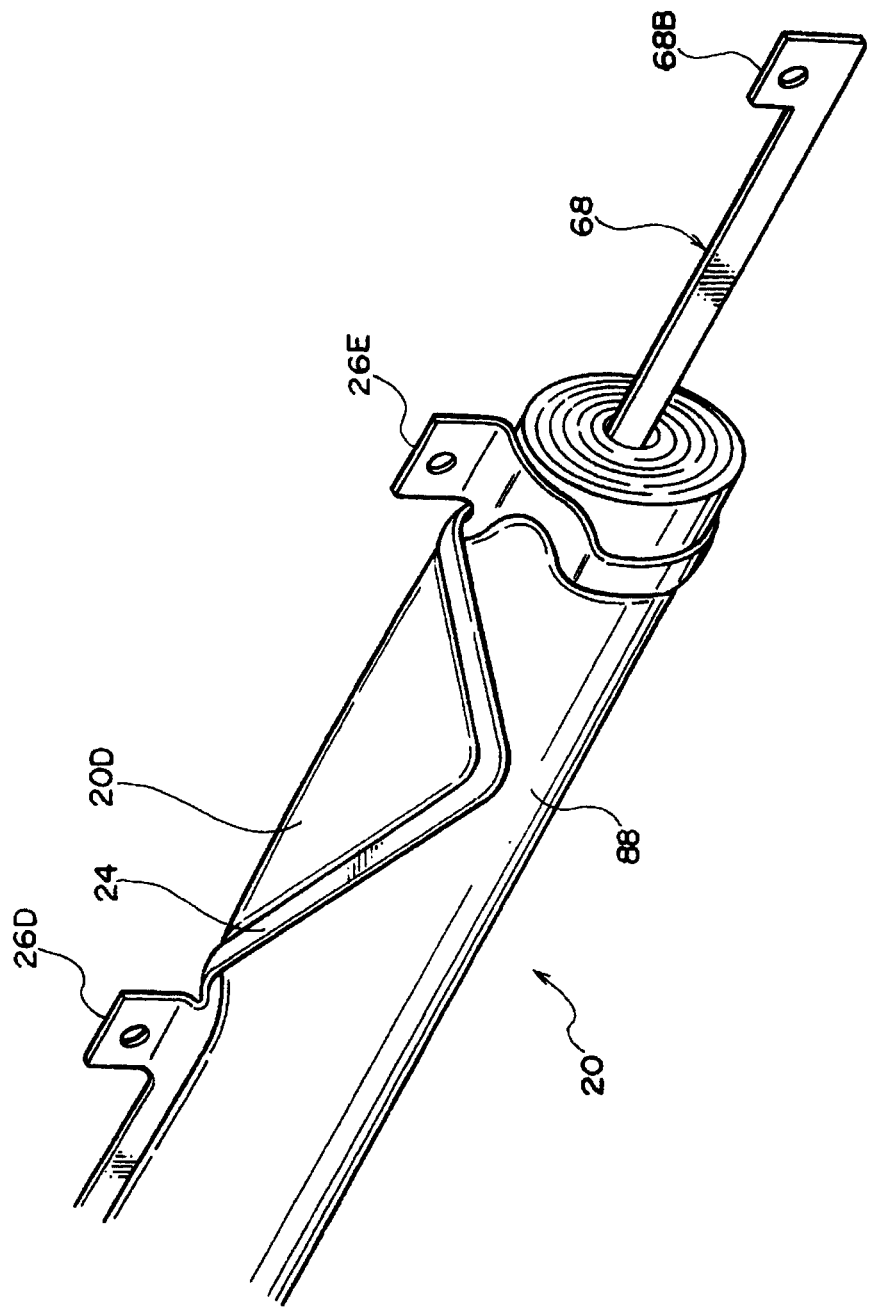
FIG. 7 is a magnified perspective view illustrating a state in which the upper expansion portion is bellows-folded from the state illustrated in FIG. 6 (a first time).
Figure 8:
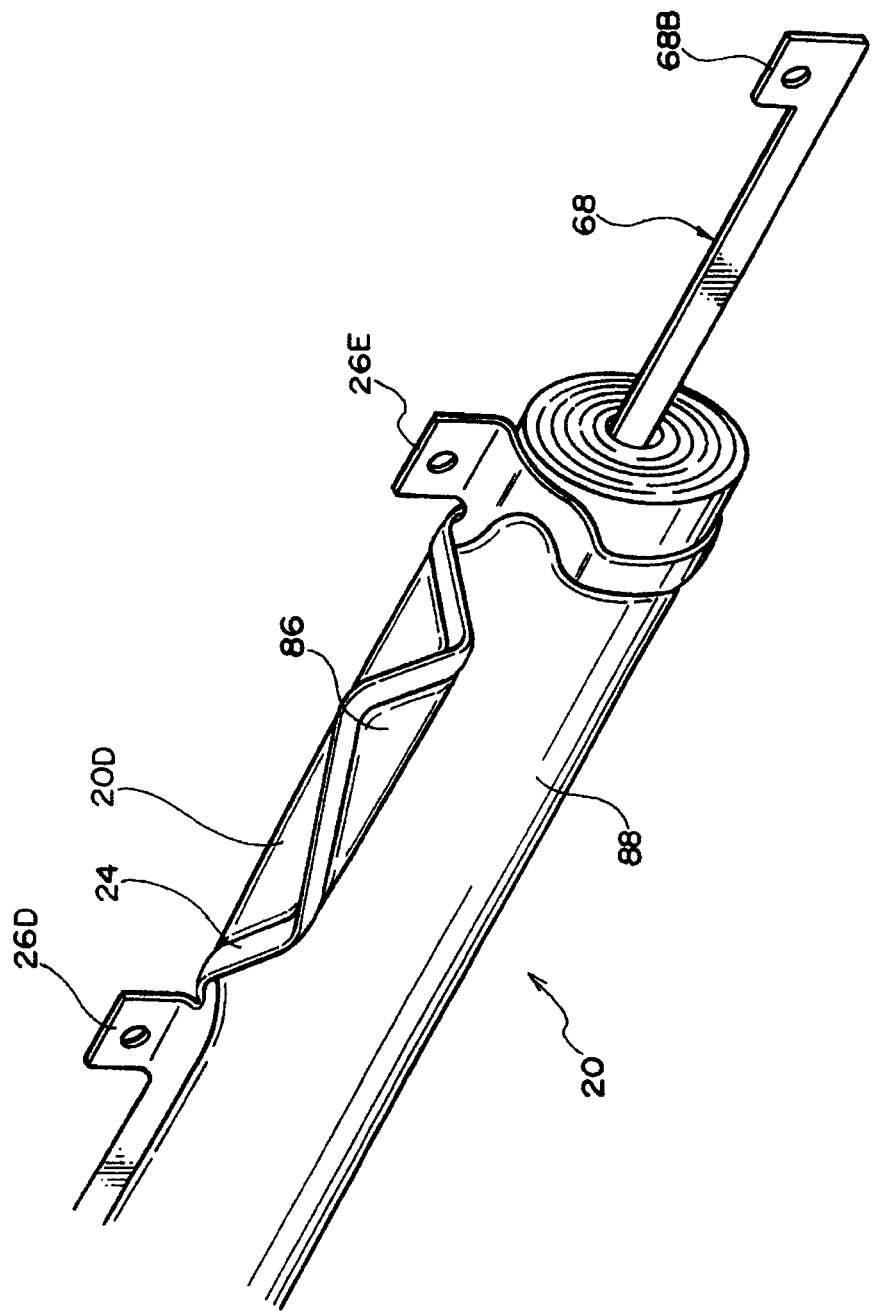
FIG. 8 is a magnified perspective view illustrating a state in which the upper expansion portion is bellows-folded from the state illustrated in FIG. 7 (a second time).

Next, using FIG. 3 and FIG. 5 to FIG. 8, a folding process of the above-described airbag 20 is described. First, the airbag 20 is put into a flat deployment condition as illustrated in FIG. 3 to FIG. 5. Then, as illustrated in FIG. 6, the main body portion 50 of the airbag 20 is folded up by roll-folding. Then, as illustrated in FIG. 7 and FIG. 8, the upper expansion portion 20D is folded by bellows-folding. The folded upper expansion portion 20D is placed on the upper face of the main body portion 50 that has already been folded into a roll.

—Operation and Effects—

Next, operation and effects of the present exemplary embodiment are described.

At the time of a side collision or the time of a rollover of the vehicle, that state is detected by the side collision detection sensor or rollover detection sensor, and a detection signal is inputted to the airbag ECU. When the side collision state or rollover state is identified by the airbag ECU, the inflator 22 operates and gas is supplied into the airbag 20 that is contained in the folded state along the roof side rail 18 of the vehicle.

The gas inflows into the airbag 20 through the gas introduction portion 20C. The inflowing gas flows through the communication channels 42 and 44 into the front seat expansion portion 20A and the rear seat expansion portion 20B, and also flows into the upper expansion portion 20D and the rear expansion portion 20E.

When the gas flows into the rear expansion portion 20E, the rear expansion portion 20E expands and, subject to a reaction force at the quarter pillar inner panel 28, pushes the quarter pillar garnish 48 to the compartment inner side. Accordingly, the unillustrated resin clip detaches from the quarter pillar inner panel 28, and hence the quarter pillar garnish 48 separates (moves) to the compartment inner side. However, because the quarter pillar garnish 48 is coupled to the quarter pillar inner panel 28 by the cordlike strap 52, the separation distance is regulated to a predetermined distance (for example, 40 mm). Thus, by the quarter pillar garnish 48 moving away from the quarter pillar inner panel 28 to the compartment inner side, the gap 66 between the quarter pillar garnish 48 and the quarter pillar inner panel 28 is widened, and it is easier for the rear side strap 68 to pass therethrough.

Then, the front seat expansion portion 20A and rear seat expansion portion 20B of the airbag 20 are expanded and deployed in the form of a curtain below the roof side rail, while pushing the terminal part 34A of the roof head lining 34 open to the compartment inner side. At the same time, the upper expansion portion 20D is expanded and deployed to the compartment outer side of the terminal part 34A of the roof head lining 34, more promptly than the rear seat expansion portion 20B. Thus, the front seat expansion portion 20A is interposed between the head area side surface of an occupant sitting on the front seat 38 and the door glass of a front side door 74, and the head area side surface of this occupant is protected by the front seat expansion portion 20A. In addition, the rear seat expansion portion 20B is interposed between the head area side surface of an occupant sitting on the rear seat 40 and the door glass of a rear side door 76, and the head area side surface of this occupant is protected by the rear seat expansion portion 20B and, integrally therewith, the upper expansion portion 20D that covers the protection area S of the head area side surface of this occupant.

When the front seat expansion portion 20A and the rear seat expansion portion 20B expand and deploy to below the roof side rail, the front side strap 70 and the rear side strap 68 descend from containment positions to positions along a belt line. Thus, along the lower edge of the airbag 20 (along the belt line), a tension line T is formed between the front end portion 70A of the front side strap 70 that is the front end fixing point and the rear end portion 68B of the rear side strap 68 that is the rear end fixing point. This tension line T is formed at a position that is lowered to the vehicle lower side relative to a tension line if the rear end fixing point were at the upper edge side of the rear seat expansion portion 20B (at the position of the attachment piece 26D of the present exemplary embodiment) as in the related art. Therefore, in comparison with a related art structure, an effect of preventing exposure of the occupant outside the vehicle at the time of a rollover is improved.

In the present exemplary embodiment, the border portion 72 between the roof head lining 34 and the quarter pillar garnish 48 is specified such that the deployment area Q of the upper expansion portion 20D falls within the area of arrangement of the roof head lining 34. Consequently, when the rear seat expansion portion 20B expands and deploys toward the vehicle lower side, the rear seat expansion portion 20B is prevented or inhibited from hooking on the upper end portion 48A of the quarter pillar garnish 48. In addition, in the present exemplary embodiment, the rear side strap 68 is provided but, because the quarter pillar garnish 48 is moved away (lifted) from the quarter pillar inner panel 28 by the rear expansion portion 20E and the separation distance thereof is regulated by the strap 52, the rear side strap 68 is smoothly pulled out from the containment position to positions along the belt line by passing through the enlarged gap 66 between the quarter pillar garnish 48 and the quarter pillar inner panel 28, without hooking on the quarter pillar garnish 48.

Figure 11:
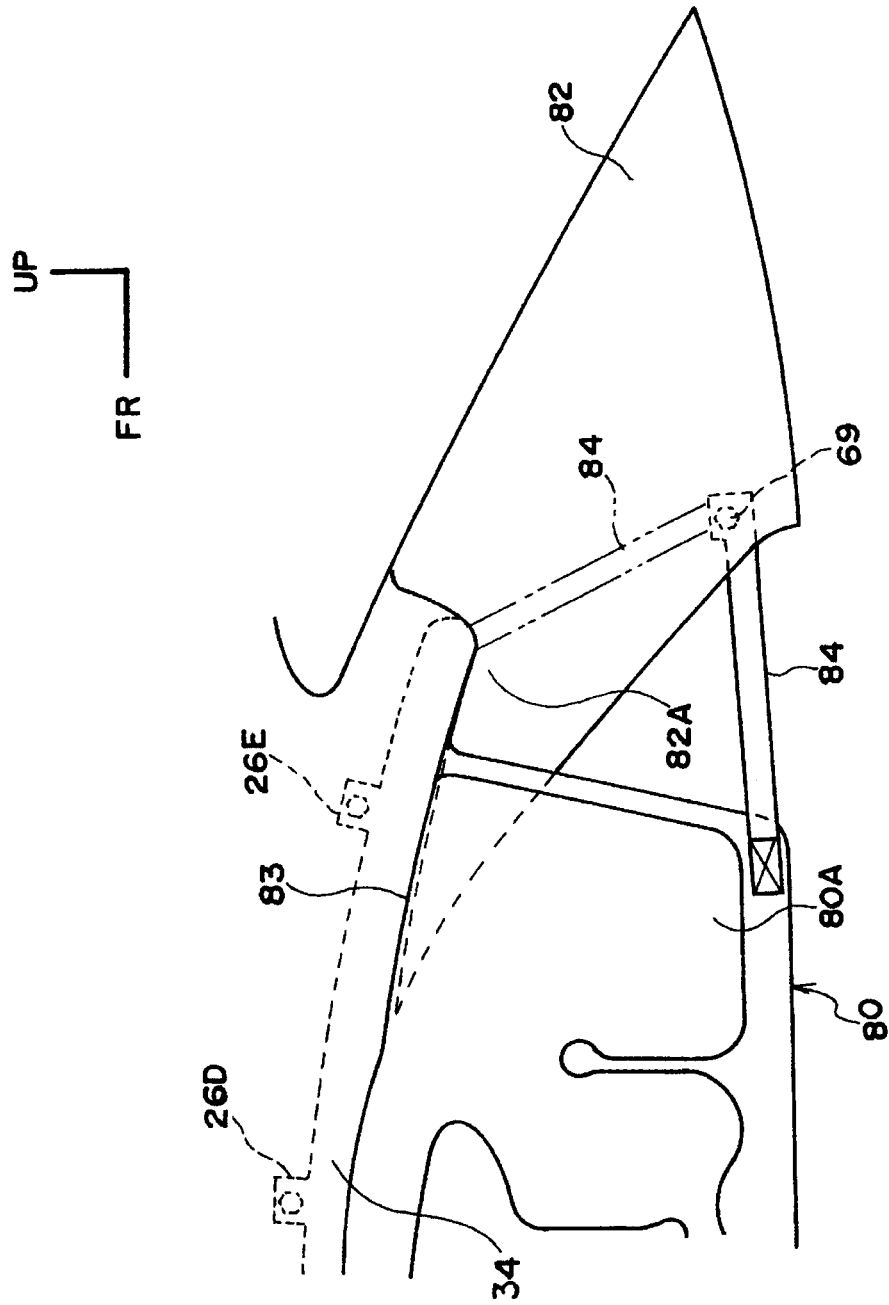
FIG. 11 is a descriptive diagram for describing operation and effects of the first exemplary embodiment.

This point is described further herebelow. A deployed state of a related art airbag 80 is illustrated in FIG. 11. As illustrated in FIG. 11, in the related art airbag 80, the above-mentioned protection area S is covered by a roll-folded rear seat expansion portion 80A. Therefore, the rear seat expansion portion 80A is disposed at the upper edge side of the protection area S. Thus, the rear seat expansion portion 80A is expanded and deployed to the compartment inner side through a border portion 83 between the roof head lining 34 and a quarter pillar garnish 82. Therefore, if a rear side strap 84 were set, when the rear side strap 84 descended from a containment position (the position shown by two-dot chain lines in FIG. 11) to a usage position (the position shown by solid lines in FIG. 11), the rear side strap 84 would hook on an upper end portion 82A of the quarter pillar garnish 82. In particular, in a sedan-type vehicle, because the quarter pillar garnish 82 has a shape that is angled forward, the protection area S overlaps with the upper end portion 82A of the quarter pillar garnish 82. Therefore, the likelihood of the rear side strap 84 hooking on the upper end portion 82A of the quarter pillar garnish 82 is higher.

In contrast, in the present exemplary embodiment described above, the rear end side attachment piece 26E is moved to sideward of the rear seat expansion portion 20B, the upper expansion portion 20D is set at the upper edge side of the rear seat expansion portion 20B, the border portion 72 between the roof head lining 34 and the quarter pillar garnish 48 is specified so as not to impinge on the protection area S, and the rear expansion portion 20E is added and moves the quarter pillar garnish 48 away from the quarter pillar inner panel 28. Therefore, the above-described concern does not arise.

To summarize the above, according to the head protection airbag device for a vehicle 10 relating to the present exemplary embodiment, at a time of deployment of the airbag 20, the rear side strap 68 may be prevented or inhibited from hooking on the upper end portion 48A of the quarter pillar garnish 48 and impeding deployment of the airbag 20.

Furthermore, in the present exemplary embodiment, the rear end side attachment piece 20E (rear end side fixing portion) of the airbag 20 is set at a position along the door opening 46. Therefore, when the rear seat expansion portion 20B expands and deploys, the rear seat expansion portion 20B may be supported from a position close to the rear seat expansion portion 20B. As a result, flapping of the rear seat expansion portion 20B at the time of expansion and deployment of the rear seat expansion portion 20B may be effectively suppressed.

In the present exemplary embodiment, the rear expansion portion 20E is set at the upper rear end side of the rear seat expansion portion 20B as described above so as to separate the quarter pillar garnish 48 from the quarter pillar inner panel 28. Thus, as well as the rear side strap 68 being less likely to hook on the upper end portion 48A of the quarter pillar garnish 48, the rear side strap 68 may quickly form the tension line T at the lower side of the rear expansion portion 20E.

In the present exemplary embodiment, the attachment piece 26E is set at a rear end upper portion of the rear expansion portion 20E. Thus, when the rear expansion portion 20E is expanding, the rear expansion portion 20E is expanded subject to a portion of a reaction force at the attachment piece 26E. Therefore, the quarter pillar garnish 48 may be quickly pushed to the compartment inner side. Thus, according to the present exemplary embodiment, the rear side strap 68 may be quickly moved at the time of the expansion and deployment of the rear seat expansion portion 20B.

In the present exemplary embodiment, as described above, the quarter pillar garnish 48 is coupled to the quarter pillar inner panel 28 by the strap 52 and the movement distance when the quarter pillar garnish 48 detaches from the quarter pillar inner panel 28 and moves to the compartment inner side is regulated. Thus, the quarter pillar garnish 48 may be prevented or inhibited from deforming excessively and breaking or scattering.

In particular, in the present exemplary embodiment the thickness of the rear expansion portion 20E is specified to be not more than half the thickness of the rear seat expansion portion 20B. Thus, deformation of the quarter pillar garnish 48 may be mostly suppressed. Therefore, breakage and scattering of the quarter pillar garnish 48 may be assuredly prevented.

In the present exemplary embodiment, the lower side with reference to the upper edge of the airbag 20 is roll-folded, and the upper expansion portion 20D that is at the upper side with reference to the upper edge of the airbag 20 is folded up by bellows-folding, and a bellows-folded portion 86 is placed on a roll-folded portion 88. Thus, at the start of deployment of the airbag 20, the upper expansion portion 20D expands and deploys prior to the front seat expansion portion 20A and the rear seat expansion portion 20B. Therefore, the protection area S of the head area side surface of an occupant sitting on the rear seat 40 may be quickly covered by the rear seat expansion portion 20B.

In the present exemplary embodiment the inflator 22 is disposed at a substantial middle portion of the airbag 20 in the length direction thereof. Thus, compared to if the inflator 22 were disposed at the front end side or the rear end side of the airbag 20, gas is supplied in parallel to both the front seat expansion portion 20A and the rear seat expansion portion 20B. Therefore, according to the present exemplary embodiment, the front seat expansion portion 20A and the rear seat expansion portion 20B may be expanded and deployed quickly.

Second Exemplary Embodiment

Figure 12:
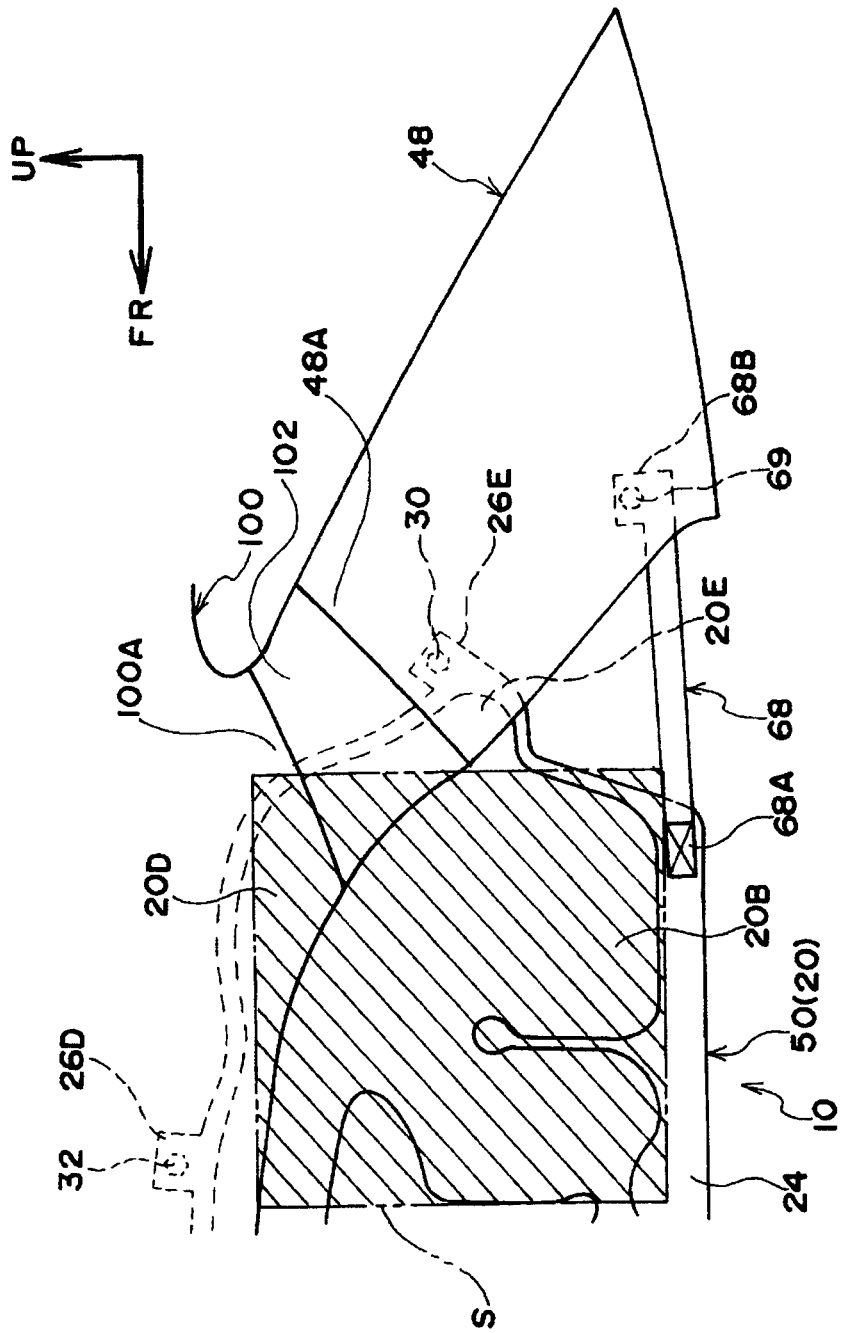
FIG. 12 is a magnified side elevation of principal portions corresponding to FIG. 4, illustrating principal portions of a head protection airbag device for a vehicle relating to a second exemplary embodiment.

Herebelow, a second exemplary embodiment of the head protection airbag device for a vehicle relating to the present invention is described using FIG. 12. Structural portions that are the same as in the first exemplary embodiment described above are assigned the same reference numerals and are not described.

As illustrated in FIG. 12, in this second exemplary embodiment, the quarter pillar side protrusion portion 34C of the roof head lining 34 of the above first exemplary embodiment is constituted by two components. That is, in this second exemplary embodiment, a protrusion portion 100A of a roof head lining 100 is shortened. Correspondingly, a supplementary ceiling member 102 that serves as a supplementary inner cover, which is constituted by a separate part from the roof head lining 100 and the quarter pillar garnish 48, is mounted. This supplementary ceiling member 102 is constituted of the same material as the roof head lining 100. The quarter pillar garnish 48 is the same as in the first exemplary embodiment. Therefore, the position of the border portion 72 is unchanged.

—Operation and Effects—

According to the structure described above, if the roof head lining 100 may not be extended to a position that covers the deployment area Q of the upper expansion portion 20D for reasons relating to molding characteristics or productivity, the supplementary ceiling member 102 may be disposed at the deployment area Q of the upper expansion portion 20D. Thus, a structure substantially the same as in the first exemplary embodiment described above may be formed. Moreover, with this configuration, molding characteristics and productivity of the roof head lining 100 may be excellently maintained.

In this exemplary embodiment, a portion of the protrusion portion 100A of the roof head lining 100 is supplemented by the supplementary ceiling member 102, but this is not a limitation. A portion of the quarter pillar garnish 48 may be divided off to serve as the supplementary ceiling member 102.

—Supplementary Descriptions of the Above Exemplary Embodiments—

Herebelow, supplementary descriptions of the present exemplary embodiments described above are given.

(1) A supplementary description of an extension of the invention of claim 1 is given herebelow.

Structures that omit the rear side strap 68 of the first exemplary embodiment are to be included in the scope of the invention of claim 1. In such a case, the attachment piece 26E corresponds to the rear end side fixing portion of claim 1. The attachment piece 26E is an aspect of being "set at a non-expanding portion 24, which is provided at the vehicle outer side of the rear seat expansion portion". In this case, the tension line of the airbag 20 is a line joining the bolt fastening point of the attachment piece 26E with the bolt fastening point of the front end portion 70A of the front side strap 70. In comparison with the related art structure mentioned above, this tension line is lowered to the vehicle lower side. Therefore, the effect of impeding exposure of an occupant outside the vehicle can be said to be significant.

In relation to the invention of claim 1, this is not limiting: rear end side fixing portions may be set at both the vehicle rear side of the rear seat expansion portion 20B and the vehicle rear side of the upper expansion portion 20D. In the latter case (the case in which rear end side fixing portions are set at both the vehicle rear side of the rear seat expansion portion 20B and the vehicle rear side of the upper expansion portion 20D), tension lines are respectively formed at a line joining the fixing point set at the vehicle rear side of the rear seat expansion portion 20B with the bolt fastening point of the front end portion 70A of the front side strap 70, and a line joining the fixing point set at the vehicle rear side of the upper expansion portion 20D with the bolt fastening point of the front end portion 70A of the front side strap 70. Of these, the tension line formed further to the vehicle lower side serves as the tension line of the airbag.

Figure 13:
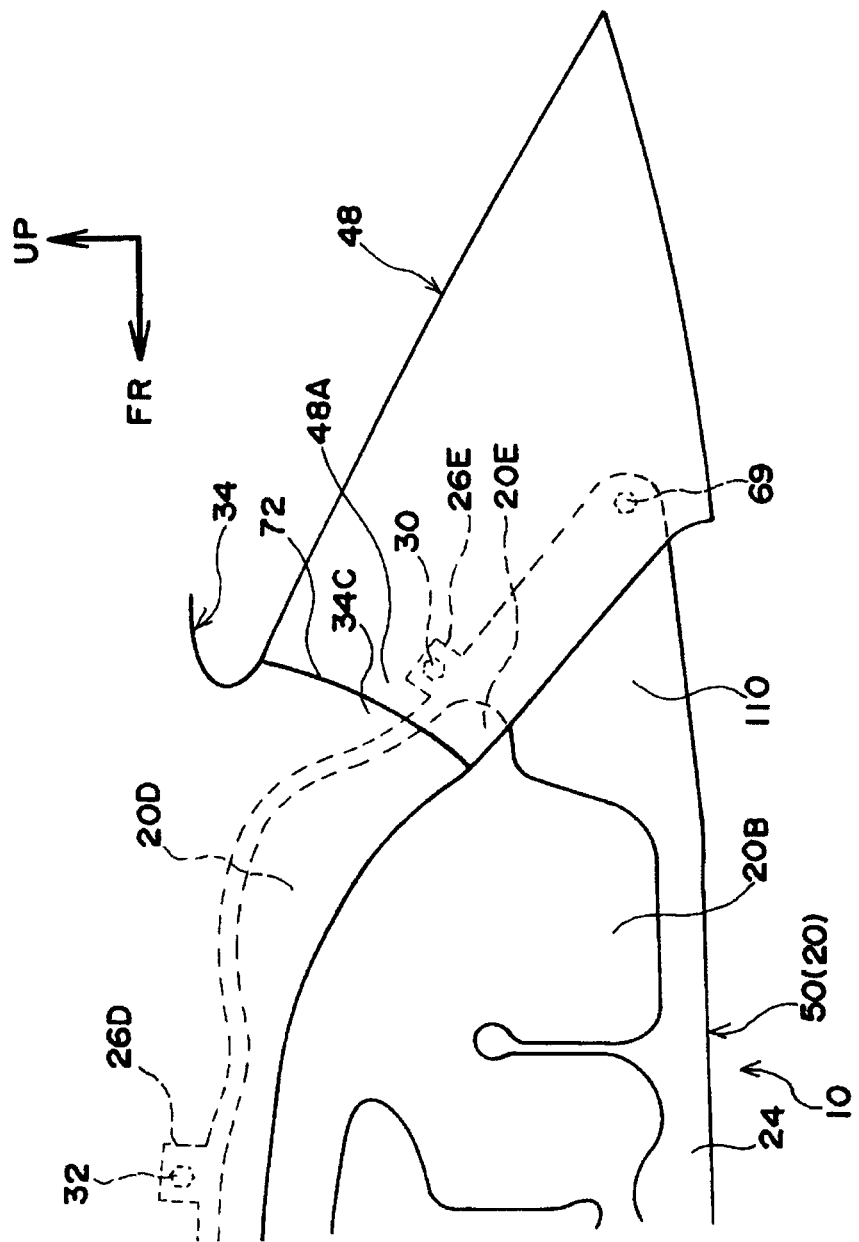
FIG. 13 is a magnified side elevation of principal portions corresponding to FIG. 4, illustrating principal portions of a head protection airbag device for a vehicle relating to another exemplary embodiment.

A device in which an enlarged non-expanding portion 110 as illustrated in FIG. 13 is specified in place of the rear side strap 68 used in the first exemplary embodiment is to be included in the scope of the invention of claim 1. Describing this simply, in this exemplary embodiment, the triangular non-expanding portion 110, which serves as the tension imparting member, is integrally formed at the lower rear end side of the rear seat expansion portion 20B. The non-expanding portion 110 is formed over a range that contains that of the rear side strap 68. A rear end portion of this non-expanding portion 110 is fastened and fixed to the quarter pillar inner panel 28 by the bolt and weld nut 69. Therefore, in this structure, the tension line is formed at exactly the same position as in the first exemplary embodiment, and the same operation and effects are provided. However, using the rear side strap 68 is advantageous for productivity when making the airbag 20.

Furthermore, a mode in which the attachment piece 26E and the rear side strap 68 at the rear end side are discarded, a non-expanding portion with a size of around half that of the non-expanding portion 110 or the like is specified, and a bolt fastening point disposed furthest to the rear end lower side of the airbag 20 is set at a rear end portion of the non-expanding portion is also to be included in the scope of the invention of claim 1

(2) In the exemplary embodiments described above, the upper expansion portion 20D is folded up by bellows-folding, but this is not limiting. The upper expansion portion 20D may be folded up by roll-folding.

(3) In the exemplary embodiment described above, the strap 52 is used as the coupler that couples the quarter pillar garnish 48 with the quarter pillar inner panel 28, but this is not limiting and other structures may be used. For example, foldable ring-form members may be provided at the quarter pillar garnish 48 and the quarter pillar inner panel 28.

(4) In the exemplary embodiment described above, the inflator 22 is disposed at the vehicle front-rear direction substantially middle position of the upper edge side of the airbag 20, but this is not limiting. The inflator 22 may be disposed at the front end side of the airbag 20 and may be disposed at the rear end side of the airbag 20.

The invention claimed is:

1. A head protection airbag device for a vehicle, comprising:
   a front seat expansion portion that is folded into a long, narrow shape and contained along a door opening, and that, by an inflow of gas via an upper side communication channel that is formed with a length direction thereof along the vehicle front-rear direction, is expanded and deployed between a head area side surface of an occupant sitting on a front seat and a door glass of a front seat side door;
   a rear seat expansion portion that is provided at the vehicle rear side of the front seat expansion portion and that is folded into the long, narrow shape and contained along the door opening, and that, by the inflow of gas via the upper side communication channel that is formed with the length direction thereof along the vehicle front-rear direction, is expanded and deployed between a head area side surface of an occupant sitting on a rear seat and a door glass of a rear seat side door;
   an upper expansion portion that is provided at an upper edge side of the rear seat expansion portion and that, by the inflow of gas, is expanded and deployed more promptly than the rear seat expansion portion to the vehicle upper side relative to a line joining a plurality of attachment pieces provided along an upper edge of a rear side expansion portion and is expanded and deployed such that a protection area of the head area side surface of the occupant sitting on the rear seat is covered by the rear seat expansion portion, at a compartment outer side of a ceiling member;
   a rear end side fixing portion that is set at a non-expanding portion, which is provided at the vehicle rear side of at least one of the upper expansion portion and the rear seat expansion portion, and that fixes the non-expanding portion to a quarter pillar inner panel covered by a quarter pillar garnish; a rear side strap disposed at a lower edge side rear end portion of the non-expanding portion attached to the quarter pillar inner panel; and
   a border portion between the ceiling member and the quarter pillar garnish, which border portion is configured such that a deployment area of the upper expansion portion falls within a range where the ceiling member is arranged.

2. The head protection airbag device for a vehicle according to claim 1, wherein the rear end side fixing portion is set at a position along the door opening.

3. The head protection airbag device for a vehicle according to claim 1, further comprising a rear expansion portion that is in fluid communication with the rear seat expansion portion and extends to the compartment outer side of the quarter pillar garnish, a vehicle width direction thickness of the rear expansion portion at a time of expansion being specified to be thicker than a width of a gap between the quarter pillar garnish and the quarter pillar inner panel disposed at the compartment outer side of the quarter pillar garnish.

4. The head protection airbag device for a vehicle according to claim 3, wherein the rear end side fixing portion is set at the rear end side of the rear expansion portion.

5. The head protection airbag device for a vehicle according to claim 3, wherein the quarter pillar garnish and the quarter pillar inner panel are coupled to one another by a coupler that couples the quarter pillar garnish to be movable from an assembly position thereof to the compartment inner side.

6. The head protection airbag device for a vehicle according to claim 5, wherein the thickness of the rear expansion portion along the vehicle width direction at a time of expansion and deployment is less than half of a thickness along the vehicle width direction of the rear seat expansion portion at the time of expansion and deployment.

7. The head protection airbag device for a vehicle according to claim 1, wherein the upper expansion portion, which bulges in a direction opposite to a direction of expansion of the rear seat expansion portion, is formed at the upper edge side of the rear seat expansion portion in a state in which the airbag provided with the front seat expansion portion, the rear seat expansion portion and the upper expansion portion is deployed in a flat shape, and a lower side of the airbag with reference to the upper edge is folded up by roll-folding, the upper expansion portion that is the upper side of the airbag with reference to the upper edge is folded up by bellows-folding, and the bellows-folded portion is disposed on the roll-folded portion.

8. The head protection airbag device for a vehicle according to claim 1, wherein a gas generator that ejects gas when operated is disposed at a vehicle front-rear direction substantially middle portion of the airbag provided with the front seat expansion portion, the rear seat expansion portion and the upper expansion portion.

9. The head protection airbag device for a vehicle according to claim 1, wherein a supplementary inner cover structured as a separate part from the ceiling member and the quarter pillar garnish is disposed in a range that overlaps with the deployment area of the upper expansion portion.

10. The head protection airbag device for a vehicle according to claim 1, wherein the upper expansion portion is disposed between two of the attachment pieces at the rear side.

* * * * *